(12) United States Patent  
Sohm et al.

(10) Patent No.: US 8,001,427 B2
(45) Date of Patent: Aug. 16, 2011

(54) METHOD AND SYSTEM OF INDEXING INTO TRACE DATA BASED ON ENTRIES IN A LOG BUFFER

(75) Inventors: Oliver P. Sohm, Toronto (CA); Brian Cruickshank, Oakville, CA (US); Manisha Agarwala, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 659 days.

(21) Appl. No.: 11/383,471

(22) Filed: May 15, 2006

(65) Prior Publication Data

US 2007/0006174 A1    Jan. 4, 2007

Related U.S. Application Data

(60) Provisional application No. 60/681,427, filed on May 16, 2005, provisional application No. 60/681,542, filed on May 16, 2005.

(51) Int. Cl.
*G06F 11/00* (2006.01)
(52) U.S. Cl. .................. 714/45; 714/30; 714/57
(58) Field of Classification Search .......... 714/45, 714/38, 57, 30
See application file for complete search history.

(56) References Cited

U.S. PATENT DOCUMENTS

| 5,737,520 | A  | * | 4/1998  | Gronlund et al. ........... 714/39 |
| 5,740,355 | A  | * | 4/1998  | Watanabe et al. .......... 714/45 |
| 5,748,881 | A  | * | 5/1998  | Lewis et al. .............. 714/47 |
| 6,057,839 | A  | * | 5/2000  | Advani et al. ........... 715/784 |
| 6,507,923 | B1 | * | 1/2003  | Wall et al. .............. 714/712 |
| 6,606,671 | B1 | * | 8/2003  | McNamer et al. ........... 710/18 |
| 6,658,416 | B1 | * | 12/2003 | Hussain et al. ........... 707/10 |
| 7,039,644 | B2 | * | 5/2006  | Hind et al. .............. 707/101 |
| 7,069,176 | B2 | * | 6/2006  | Swaine et al. ........... 702/176 |
| 7,395,131 | B2 | * | 7/2008  | Funk .................... 700/108 |
| 7,441,155 | B2 | * | 10/2008 | Mastro ................... 714/39 |
| 7,590,892 | B2 | * | 9/2009  | Sohm et al. ............ 714/38.13 |
| 2002/0111785 | A1 | * | 8/2002 | Swoboda et al. .......... 703/28 |
| 2004/0243662 | A1 | * | 12/2004 | Mastro .................. 709/200 |

* cited by examiner

*Primary Examiner* — Robert Beausoliel, Jr.
*Assistant Examiner* — Elmira Mehrmanesh
(74) *Attorney, Agent, or Firm* — Robert D. Marshall, Jr.; W. James Brady; Frederick J. Telecky, Jr.

(57) ABSTRACT

A method and system of indexing into trace data based on entries in a log buffer. At least some of the illustrative embodiments are methods comprising executing a traced program on a target device. The traced program writes entries to a log buffer within the target device, and the traced program also contemporaneously writes an index value for each entry to a register. The index value written to the register becomes part of trace data regarding the traced program and correlates each entry to a respective portion of the trace data. Using the information one may either or both: display on a display device a portion of the trace data (the portion selected based on selecting an entry from the log buffer); or display on the display a portion of the log buffer (the portion selected based on selecting an entry from the trace data).

20 Claims, 4 Drawing Sheets

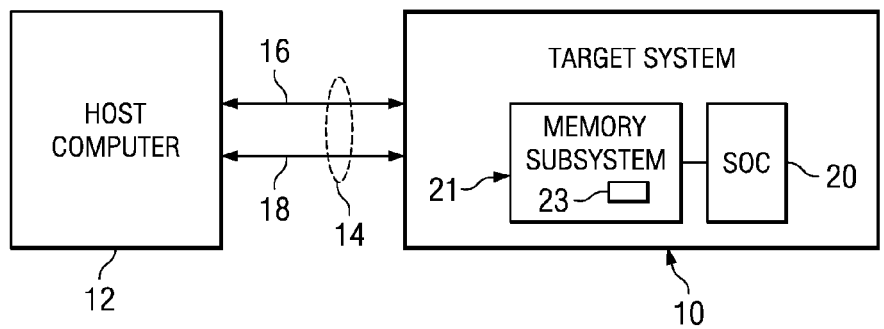
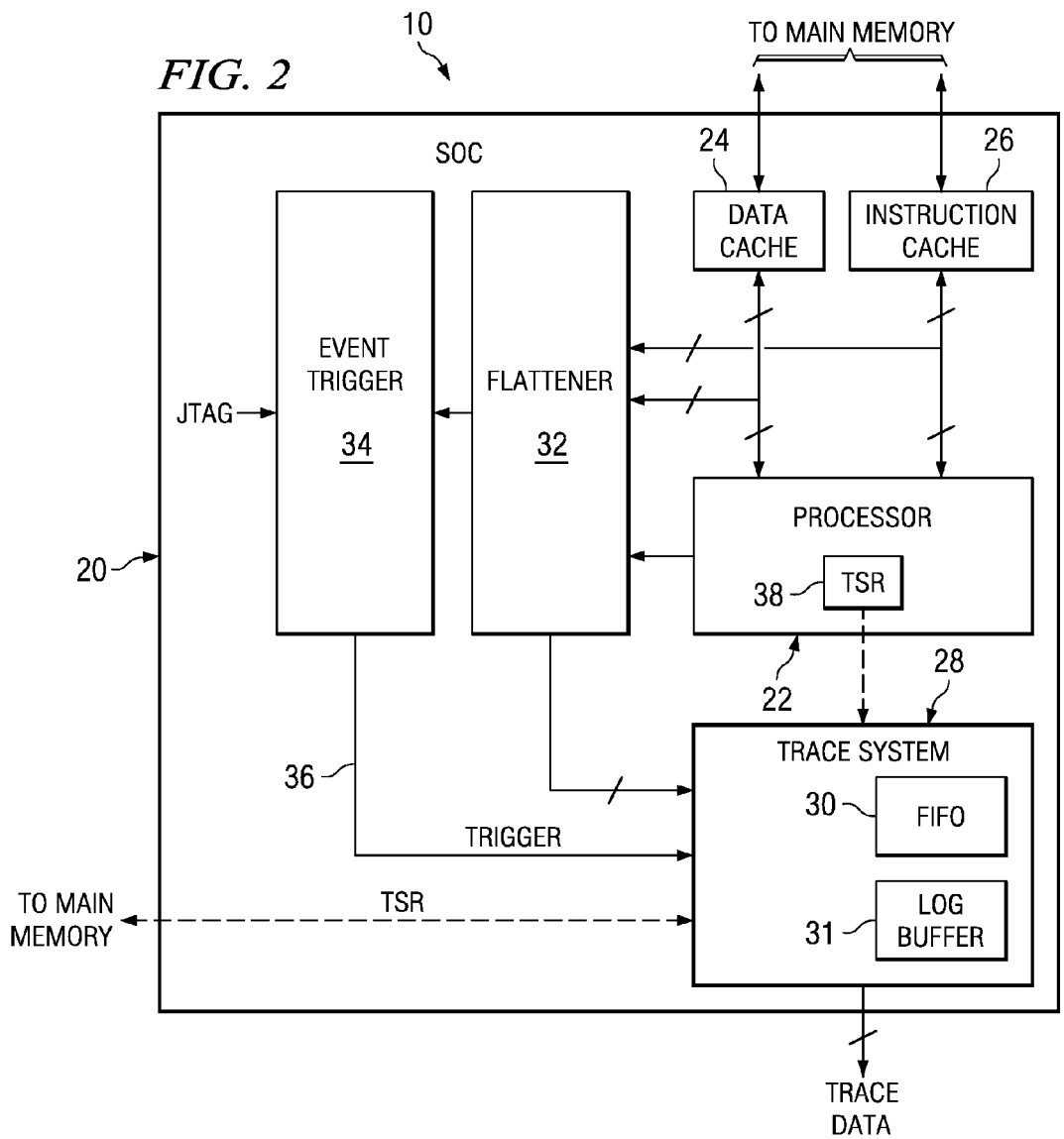

| | | | | | |
|---|---|---|---|---|---|
| 00008568 | 00008000 | | NOP | | |
| 0000856C | 040403E2 | | MVC.S2 | CSR,B8 | |
| 00008570 | 000000AB | | MVK.S2 | 0x0001,B0 | |
| 00008574 | 02A3CF5A | \|\| | AND.L2 | -2,B8,B5 | |
| 00008578 | 009403A2 | | MVC.S2 | B5,CSR | |
| 0000857C | 22903224 | [ B0] | LDB.D1T1 | *++A4[0x1],A5 | L1D RM, WB Flush, 0x12345678, 10 stalls |
| 00008580 | 02900942 | | MV.D2 | B4,B5 | |
| 00008584 | 03946CA2 | | SHL.S2 | B5,0x3,B7 | |
| 00008588 | 029CBA42 | | ADDAH.D2 | B7,B5,B5 | |
| 0000858C | 0294B1E2 | | ADD.S2X | B5,A5,B5 | Crosspath, 1 stall |
| 00008590 | 018428C1 | | ZERO.D1 | A3 | |
| 00008594 | 00800943 | \|\| | MV.D2 | B0,B1 | |
| 00008598 | 031401E0 | \|\| | ADD.S1 | A0,A5,A6 | |
| 0000859C | 41982214 | [ B1] | LDBU.D1T1 | *++A6[0x1],A3 | L1P Miss, 8 stalls; B1=1 |
| 000085A0 | 00006000 | | NOP | 4 | |
| 000085A4 | 0298A843 | | ADD.D2 | B6,B5,B5 | |
| 000085A8 | 008C87A0 | \|\| | AND.S1 | 4,A3,A1 | |
| 000085AC | 22140943 | [ B0] | MV.D2 | B5,B4 | |
| 000085B0 | 900425E2 | [!A0] | ZERO.S2 | B0 | DMA completion int; B0=0 |
| 000085B4 | 2FFFFF91 | [ B0] | B.S1 | 0x859C | |
| 000085B8 | 22903224 | [ B0] | LDB.D1T1 | *++A4[0x1],A5 | |
| 000085BC | 00000000 | | NOP | | |

TITLE

FIG. 5

| # | Trace # | Log Text |
|---|---------|----------|
| 0005 | 065903 | Event: Modem State = Offhook |
| 0006 | 170340 | Event: Modem State = Waiting for dialtone |
| 0007 | 189903 | Event: Modem State = Dialing |
| 0008 | 209209 | Event: Modem State = Negotiating rate |
| 0009 | 229900 | Event: Modem State = Connected at 33200 |
| 0010 | 390002 | Event: VPN State = Balancing |
| 0011 | 399340 | Event: VPN State = Secure connection established |
| 0012 | 403503 | Error: Access violation at address 0x33900033 |
| 0013 | 403530 | Error: Stack overrun |
| 0014 | 403590 | Error: Task 3 killed |
| 0015 | 404904 | Event: Modem State = Connection dropped |
| 0016 | 449903 | Error: Exception at address 0x0008CCC0 |
| 0017 | 780044 | Error: Unexpected input value |
| 0018 | 781120 | Event: Target Reset |
| 0019 | 784332 | Event: Safe mode initialization entered |
| 0020 | 799003 | Event: Memory Dump complete |

Log Buffer — 60, 66

| # | PA | Disas | | | RT... | RS |
|---|----|----|---|---|-------|-----|
| 449918 | 00008CC4 | B.S1 | | 0x00d420 | 0 | PcStart\|TimingStart |
| 449919 | 00008CC8 | MVK.S1 | | 0x2911,A3 | 1 | |
| 449920 | 00008CCC | MVKH.S1 | | 0x0000,A3 | 2 | PipelineStall |
| 449921 | 00008CCC | MVKH.S1 | | 0x0000,A3 | 8 | |
| 449922 | 00008CD0 | STW.D2T1 | | A3,*+B15[1] | 9 | |
| 449923 | 00008CD4 | ADDKPC.S2 | | RL11 (PC+3... | 10 | |
| 449924 | 00008CD8 | STW.D2T2 | | B10,*+B15[2] | 11 | |
| 449925 | 00008CDC | OR.D1 | \|\| | 0,A11,A4 | 12 | PcStop\|TimingStop |
| 449926 | 0000D420 | B.S2 | | LOG_F_even... | 13 | PcStart\|TimingStart |
| 449927 | 00008CE0 | B.S1 | | 0x00d180 | 14 | |
| 449928 | 00008CE4 | ADDKPC.S2 | | RL12 (PC+1... | 15 | |
| 449929 | 00008CE4 | ADDKPC.S2 | | RL12 (PC+1... | 16 | |
| 449930 | 00008CE4 | ADDKPC.S2 | | RL12 (PC+1... | 17 | |
| 449931 | 00008CE8 | OR.D1 | | 0,A10,A4 | 18 | PipelineStall |
| 449932 | 00008CEC | OR.D2 | | 0,B11,B4 | 24 | |
| 449933 | 00008CEC | OR.D2 | | 0,B11,B4 | | |

Trace — 62, 64 time from start: 0.0002 ms

Receiver stopped (eStoppedFull)
Ready

METHOD AND SYSTEM OF INDEXING INTO TRACE DATA BASED ON ENTRIES IN A LOG BUFFER

CROSS-REFERENCE TO RELATED APPLICATIONS

This application claims the benefit of Provisional Application Ser. No. 60/681,427 filed May 16, 2005, entitled "Debugging Software-Controlled Cache Coherence," and Provisional Application Ser. No. 60/681,542, filed May 16, 2005, titled "Debug Profiling Applications," both of which are incorporated by reference herein as if reproduced in full below.

BACKGROUND

In order to look for errors in software programs (an activity referred to as "debugging"), some software development tools provide the ability to record the sequence of operations that a processor performed while executing a program. This is referred to as tracing the execution of the program, and the information that is captured is referred to as trace data The trace data may comprise data such as the addresses of operational codes (opcodes) executed by the processor and values of various processor registers at each executed instruction.

The high speeds at which processors operate can cause the volume of trace data that is capture to become overwhelming. For example, a processor core executing at over a GigaHertz produces billions of events in just one second of trace data capture. Thus, while the information the programmer is seeking to assist in debugging a program may be present in the trace data, locating the information in a file with over a billion captured events is difficult.

SUMMARY

The problems noted above are solved in large part by a method and system of indexing into trace data based on entries in a log buffer. At least some of the illustrative embodiments are methods comprising executing a traced program on a target device. The traced program writes entries to a log buffer within the target device, and the traced program also contemporaneously writes an index value for each entry to a register. The index value written to the register becomes part of trace data regarding the traced program and correlates each entry to a respective portion of the trace data. Using the information one may either or both: display on a display device a portion of the trace data (the portion selected based on selecting an entry from the log buffer); or display on the display a portion of the log buffer (the portion selected based on selecting an entry from the trace data).

Other illustrative embodiments are a computer-readable medium storing a debug-trace program that, when executed by a processor, causes the processor to obtain entries from a log buffer within a target device in which a traced program executes (the entries written during execution of the traced program), obtain trace data related to execution of the traced program, and display a portion of the trace data on a display device (the portion selectable by a user of the debug-trace program based on the entries from the log buffer).

Yet still other illustrative embodiments are a computer-readable medium storing a program that, when executed by a processor, causes the processor to write an entry to a log buffer within a target device (the entry written during execution of the program and comprising a data field and an index value), and write a register with the index value contemporaneous with writing the entry (wherein the index value written to the registers becomes part of trace data regarding the traced program and correlates the entry to a portion of the trace data).

BRIEF DESCRIPTION OF THE DRAWINGS

For a detailed description of exemplary embodiments of the invention, reference will now be made to the accompanying drawings in which:

FIG. 1 shows a system in accordance with embodiments of the invention;

FIG. 2 shows, in greater detail, a target system in accordance with embodiments of the invention;

FIG. 4 shows an illustrative display of trace data;

FIG. 5 shows an illustrative display of trace data and correlated log buffer entries in accordance with embodiments of the invention.

NOTATION AND NOMENCLATURE

Figure 3:
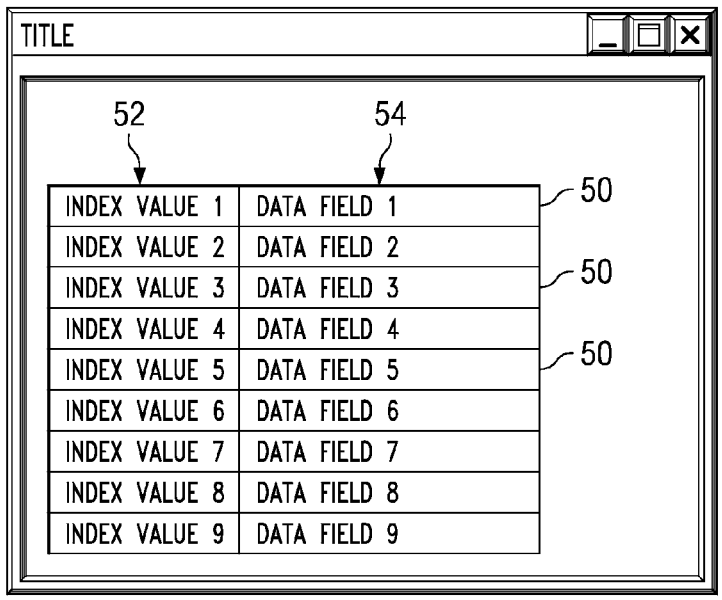
FIG. 3 shows an illustrative "dashboard" into traced data in accordance with embodiments of the invention.

Certain terms are used throughout the following description and claims to refer to particular system components. As one skilled in the art will appreciate, companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to. . . ." Also, the term "couple" or "couples" is intended to mean either an indirect or direct electrical connection. Thus, if a first device couples to a second device, that connection may be through a direct connection, or through an indirect connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

FIG. 1 illustrates software development system 100 in accordance with some embodiments of the invention. The software development system 100 comprises a target system 10 coupled to a host computer 12. The target system 10 may be any processor-based system upon which a software programmer would like to test and/or debug a computer program. The target system 10 may be, for example, a cellular telephone, a BLACKBERRY® device, or a computer system. In some embodiments, the host computer stores and executes a program that is used to debug, and in some cases gather trace data and produce trace data displays, and thus is referred to herein as a debug-trace program 13. In other embodiments, the debug-trace program 13 may execute on the target system 10, and in these embodiments is referred to as an embedded software debugger.

The host computer 12 and target system 10 couple by way one or more interconnects 14, such as cables. In some embodiments, the host computer 12 couples to target system 10 by way of a multi-pin cable 16, such as a Mictor available from Tektronix Texas, LLC of Richardson, Tex. The multi-pin cable 16 enables transfer of trace data files from the target system 10 to the host computer 12. In alternative embodiments, the host computer 12 couples to the target system 10 by way of a serial cable 18 across which the host computer 12 may communicate with the joint test action group (JTAG) communication system of target system 10. A JTAG-based communication between the host computer 12 and target system 10 has lower bandwidth than a multi-pin connection through illustrative cable 16. In yet still further alternative embodiments, the multi-pin cable 16 may have two or more pins dedicated JTAG-based communication, an thus the host computer 12 and target system 10 may communicate using different protocols, yet over the same multi-pin cable 16. Other embodiments comprise sending data over optical interconnect to the host computer, or logging the captured trace data in memory or disk that is accessible by the target processor where it can be accessed by an embedded software debugger. In other embodiments, the trace data may be captured on the target system and transferred to the host computer by any of a variety of now existing or after developed transport protocols (e.g., Ethernet, transmission control protocol/internet protocol (TCP/IP), institute of electrical and electronic engineers (IEEE) 1391 protocol, RS-232, and peripheral components interconnect (PCI)), which allow the host computer to interact over a distance such that the host computer and target system need not be co-located.

FIG. 2 shows in greater detail a portion of the target system 10. In particular, a target system 10 in accordance with embodiments of the invention comprises a System-On-A-Chip (SOC) 20. The SOC 20 is so named because many devices that were previously individual components are integrated on a single integrated circuit. For example, the SOC 20 may comprise one or more processors 22, data cache 24, instruction cache 26, and other devices (e.g., random access memory (RAM), and memory controllers). In accordance with embodiments of the invention, the SOC 20 also comprises a trace system 28. The trace system 28 comprises a First In-First Out buffer (FIFO) 30 in which trace data is gathered. The trace data from FIFO 30 is sent to the host computer 12 (FIG. 1) by the trace system 28. Because the processor 22 may perform a plurality of parallel operations, the SOC 20 also comprises a data flattener circuit 32. As the name implies, the data flattener circuit 32 gathers the pertinent trace data from the processor's execution pipeline, serializes or "flattens" the trace data so that events that execute at different stages in the pipeline are logged in the correct sequence, and forwards the trace data to the FIFO buffer 30 in the trace system 28. A non-limiting list of the various data points the data flattener 32 may read, serialize and then provide to the FIFO buffer 30 is: direct memory access (DMA) trace data; cache memory trace data; addresses of opcodes executed by the processor 22; the value of hardware registers in the processor 22; and interrupts received by the processor 22.

Still referring to FIG. 2, the integrated circuit SOC 20 further comprises an event trigger system 34. The event trigger system 34 couples to the data flattener 32 and receives a least a portion of the serialized data. In response to various pre-programmed triggers (where such triggers may be communicated to the event trigger system 34 by way of JTAG communications), the event trigger system 34 asserts a trigger signal 36 to the trace system 28. In response, the trace system 28 accumulates trace data in its FIFO buffer 30 (the data arising just after the assertion of the trigger signal 36) and sends the trace data to the debug-trace program 13. In some embodiments the trace system 28 additionally compresses the trace data from the FIFO buffer 30 prior to sending the trace data.

Referring simultaneously to FIGS. 1 and 2, a user of the host computer 12 wishing to debug a software program executable on the target system 10 enables the event trigger system 34, possibly by JTAG-based communication over the serial communication cable 18. Thereafter, the user initiates the target program on the target system 10. The processor 22 executes the target program, while the data flattener 32 gathers pertinent information, serializes that information, and forwards the pertinent information both the event trigger system 34 and the trace system 28. At points in time before the trace system 28 is enabled by the event trigger system 34, the data supplied to the trace system 28 by the flattener 22 may be ignored or discarded. At a point in execution of the target program, the trigger events occur and the trigger events are identified by the event trigger system 34. The event trigger system 34 asserts the trigger signal 36 to the trace system 28. In response, the trace system 28 collects the trace data in the FIFO buffer 30. Simultaneously with the collecting, the trace system 28 sends the trace data to the host computer 12. In embodiments where all, or substantially all, the events after the assertion of the trigger signal 36 are part of the trace data, the trace system 28 sends the trace data over the relatively high bandwidth multi-pin cable 16. In yet still other embodiments, sending of the trace data from the target system 10 to the host computer 12 may be accomplished by sending data over the JTAG-based communication cable 18 and the relatively high bandwidth multi-pin cable 16. Other embodiments comprise sending the data over an optical interconnect to the host computer, or logging the captured trace data in a memory or disk that is accessible by the target processor where it can be accessed by another program running on the target processor (e.g., accessed by an embedded software debugging program).

Still referring to FIG. 2, the speed at which the processor 22 operates means that the volume of trace data may be significant. For example, a processor circuit 22 having a core frequency over 1.0 GigaHertz may result in trace data having over a billion events for a trace time of only one second. In order to assist the user of the host computer 12 in finding the pertinent events and in accordance with embodiments of the invention, the trace system 28 is configured to insert into the trace data various index values (written by either the operating system of the target system 10 or the application program executing on the target system 10). The debug-trace program 13 receives the trace data including the various index values, and enables the user to select portions of the trace data to display using the index values. The discussion now turns to various mechanisms for insertion of the index value, followed by a plurality of illustrative situations where the index value may be used.

Still referring to FIG. 2, the trace system 28 obtains the index value from a target state register (TSR). In some embodiments the target state register is a hardware register located within the processor 22, such as target state register 38. Although the hardware register version of the target state register 38 is shown to couple to the trace system 28 (by way of a dashed line), it will be understood that the value of the target state register may, in actuality, be supplied to the trace system after passing through the data flattener 32. A hardware register in the processor 22 may be equivalently referred to as an opcode addressable register. In alternative embodiments, the target state register may be a register outside the processor. For example, and referring briefly to FIG. 1, the SOC 20 may couple to a memory subsystem 21 which implements the target state register 23. In these alternative embodiments, the target state register 23 may be readable by a memory operation to an assigned address, and thus target state register 23 may be referred to as a memory addressable register. In yet still other embodiments, the memory subsystem 21 may be integrated with other devices of the SOC 20.

The trace system 28 is configured to send the value in the target state register 23, 38 along with the trace data only when the value in the target state register 23, 38 is newly written. Once the target state register has been newly written and not yet read, it becomes the highest priority data item for the trace system 28 to capture, preempting other types of data. If the trace stream is disabled for a period of time (e.g., while waiting for a trigger to occur or while waiting for the debugging system to initiate a read of the information), attributing higher priority to the information in the target state register 23, 38 ensures that the last value written into the target state register will be presented first in the trace stream once trace data capture is again active. In embodiments where the trace system 28 couples to the host computer 12 by way of the relatively high bandwidth connection, the trace system 28 is configured to send the value to the host computer system 12 in a message wrapping protocol that identifies to the host computer 12 that the information is the value of the target state register. Other systems for differentiating values of the target state register from other trace data may be equivalently used.

In order to assist the programmer in debug operations, a target or traced program may be 'instrumented' with code that writes information to an event or log buffer during execution. A log buffer may be equivalently referred to as a data table, data array and/or data structure. The information written to the log buffer by the target or traced program may take many forms. In some embodiments, the traced program writes information indicative of task switches in the target system 10. In embodiments where the target or traced program performs a multi-channel decode operation (where each decode program is substantially the same yet operating on different data streams), the target or traced program is configured to assist debug operations by writing information to the log buffer regarding upon which channel of the plurality of channels the traced code operates.

Further with regard to illustrative information to write to the log buffer, many programs utilize state machines as the mechanism to keep track of state within a process, and to perform particular actions at appropriate times. One example of a program where a state machine may be used is a telephone dialing modem where several states exist (e.g., waiting for dial tone, dialing, listening for carrier, handshaking protocols, data exchange, and the like). In these embodiments, the target or traced program writes state machine state data to the log buffer.

In some embodiments, data from a log buffer is read by the debug-trace program 13 after execution of the target or traced program has stopped. In situations where the log buffer does not contain a sufficient number of storage locations to store all the log data written during a trace period (e.g., log buffer has too few locations, or the log buffer is circular and the number of entries expected will overwrite earlier entries during the trace period), the log buffer may be read and cleared by the debug-trace program 13 one or more times during the trace period to ensure all the entries generated are available to the debug-trace program.

In some embodiments, the trace system 28 (FIG. 2), in addition to the first-in first-out buffer 30, implements a series of memory locations 31 to be the log buffer. In alternative embodiments, the log buffer is located in random access memory, either on the SOC 20 or in separate memory subsystem 21 (FIG. 1). Regardless of the precise location of the log buffer, the debug-trace program 13 has access to the log buffer and can read data from the log buffer as described above.

The logical construction of the log buffer may take many forms. In some embodiments, the log buffer is implemented as a plurality of equivalently sized data fields. In alternative embodiments, the log buffer is implemented as a plurality of arbitrary sized data fields. In yet still other embodiments, the log buffer is a table having a plurality of rows and columns. Regardless of the logical construction of the log buffer, in accordance with embodiments of the invention each entry in the log buffer comprises a data field and an index value. The data field comprises target or traced program information (e.g., task switch information, channel information, state of a software state machine, and the like). The index value is an index into the log buffer that identifies the location of the data field in the log buffer. The index value could be, for example, a pointer, packet number, sequence number, row number or any other value indicative of the location of the data field. For cases where a circular log buffer is used, the index value may include temporal information that can be used to differentiate between entries that are circularly written into the same location of the circular log buffer. For example, the index may be composed of multiple bit-fields, one of which identifies where in the circular buffer the log entry is stored in and another of which stores a 'wrap around counter' that is incremented each time the write pointer to the circular buffer wraps around to the start of the buffer and is itself stored in a log buffer data structure that is read by the host whenever it reads the log buffer. In some embodiments, the index value is an inherent part of the entry, and in other embodiments the index value is generated and written by the target or traced program.

In addition to writing the data field (and possibly the index value), the target or traced program in accordance with embodiments of the invention also places the index value in the trace data by writing the index value to the target state register. Writing the index value to the target state register contemporaneously with writing the log buffer ensures that the index value is present in the trace data associated with the traced program. In accordance with embodiments of the invention, when a user of the debug-trace program wishes to select a portion of the trace data to display, the selection may be based on a particular log entry from log buffer. By correlating the index value of the log entry to the index value in the trace data, the appropriate trace data portion is identified and may be displayed.

FIG. 3 illustrates a debug-trace program "dashboard" to assist a user in navigating to a portion of the traced data based on the information in the log buffer. In particular, FIG. 3 shows a plurality of entries 50, each entry comprising an index value 52 and a data field 54. Although FIG. 3 illustrates embodiments where the index values 52 are visible, in alternative embodiments the index values are hidden from the user. Moreover, while the illustrative dashboard of FIG. 3 shows nine entries, any number of entries may be generated during a trace period and some or all of the entries shown on the dashboard. By selecting one of the entries in the dashboard, the debug-trace program navigates the user to the trace events proximate in time to the entry. In some embodiments, selecting the entry navigates the user to the trace events that occur just after the entry. In other embodiments, selecting an entry takes the user to the trace events just prior to the entry. In yet still other embodiments, selecting an entry shows the trace events leading up to and just after the entry. FIG. 4 shows an illustrative set of set trace data 56. Referring simultaneously to FIGS. 3 and 4, selecting one of the entries from FIG. 3, in accordance with embodiments of the invention, brings up a window of trace data similar to that of FIG. 4, without the user having to scroll through possibly billions of events in the captured traced data.

FIG. 5 shows an illustrative display 60 that correlates trace data with logged events. In particular, in the embodiments associated with FIG. 5, scrolling through the trace data display 62 or selecting an address (e.g., line 64) in the trace data display 62 adjusts the log buffer display 66 to show and highlight the last log buffer entry written prior to execution of the instruction of the selected line 64 in the trace display 62. Likewise, selecting a line in the log buffer display 66 adjusts the trace data display 62 to show and highlight the next trace entry that was captured after the log buffer entry was written.

Figure 6:
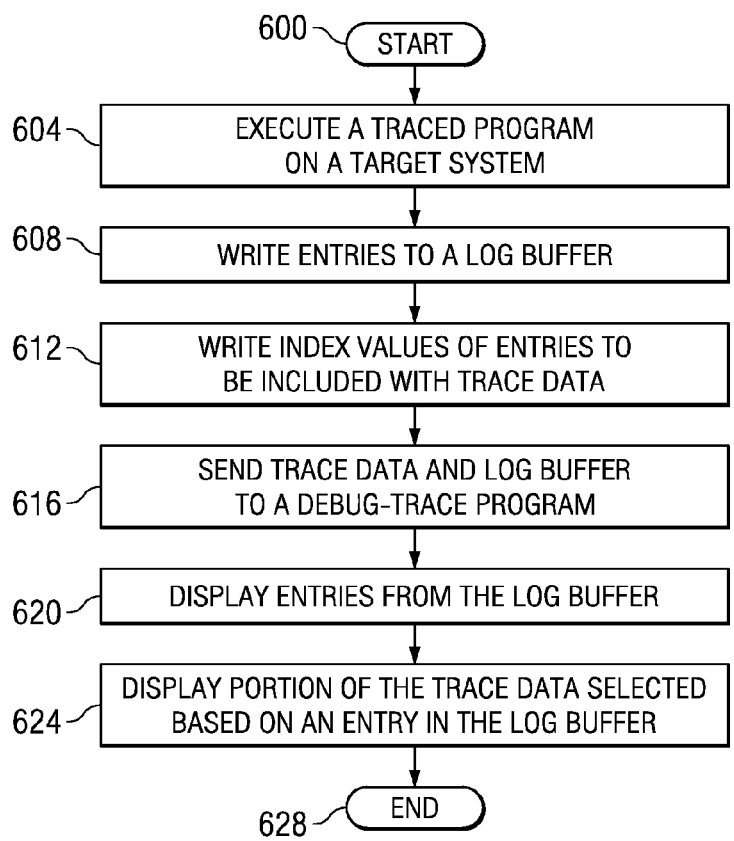
FIG. 6 shows a method in accordance with embodiments of the invention.

FIG. 6 illustrates a method in accordance with embodiments of the invention. In particular, the method starts (block 600), and proceeds to executing a target or traced program on a target system (block 604). During execution, the traced program writes entries to a log buffer (block 608). In some embodiments, the traced program writes information indicative of task switches in the target system 10. In other embodiments, the traced program writes information to the log buffer regarding upon which channel of the plurality of channels the traced code operates at the time. In yet still other embodiments, the traced program writes state machine state data to the log buffer. Other information regarding the traced program, or the operational environment of the traced program, may be equivalently written to the log buffer.

Regardless of the precise form of the information written by the traced program, contemporaneously with writing each entry in the log buffer the traced program also writes an index value of the entries such that the index values are part of the trace data (block 612). For example, the traced program may write the index values to the target state register, discussed above. The illustrative method then sends the trace data and the log buffer to the debug-trace program (block 616). In embodiments where the trace data and log buffer are sent off the target device, the sending may be equivalently referred to (from the perspective of the host computer 12) as obtaining the trace data and log buffers. In some embodiments the trace data is sent to a debug-trace program 13 substantially contemporaneously with creation of the trace data. The entries of the log buffer may be sent to the debug-trace program 13 once execution of the traced program has stopped so that the target device does not have to actively participate in the transfer of log or trace data. Alternatively, the entries in the log buffer may equivalently be sent to the debug-trace program during execution of the traced program. In yet other alternative embodiments, the target device sends the log buffer values to the host computer (e.g., using a universal serial bus (USB) connection) and the host computer reads trace data from the target device (e.g., from FIFO 39, a hard disk or RAM).

Once the host computer has the trace data and the log buffer entries, a debug-trace program of the host computer displays entries of the log buffer (block 620), possibly on a dashboard as illustrated in FIG. 3. When the user selects one of the entries from the dashboard, the debug-trace program identifies the index values associated with the entry, displays the portion of the trace data associated with the selected entry (block 624), and the process ends (block 628). The portion of the trace data to display is identifiable by the presence of the index value in the trace data that corresponds to the selected entry from the log buffer.

From the description provided herein, those skilled in the art are readily able to combine software created as described from the methods with appropriate general purpose or special purpose computer hardware to create a computer system and/or computer subcomponents embodying the invention, to create a computer system and/or computer subcomponents for carrying out the method of the invention, and/or to create a computer-readable medium for storing a software program to implement the method aspects of the invention. The computer readable medium could be, for example, a volatile memory, a non-volatile memory, a compact disc read only memory (CDROM), an electrically erasable programmable read only memory (EEPROM), a hard drive, and the like.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer-readable medium storing a debug-trace program that, when executed by a processor, causes the processor to:
obtain entries from a log buffer within a target device in which a traced program executes, the entries written to the log buffer during execution of the traced program;
obtain, during execution of the traced program, trace data related to execution of the traced program; and
simultaneously display the entries and a portion of the trace data on a display device with the displayed entries segregated from the displayed portion of the trace data, the displayed portion of the trace data selected for display on the display device in response to selection of one of the displayed entries by a user of the debug-trace program.

2. The computer-readable medium as defined in claim 1 wherein the trace data contains index values respectively related to said entries in the log buffer; and wherein the displayed portion of the trace data corresponds to one of the index values associated with the selected one of the displayed entries.

3. The computer-readable medium as defined in claim 2 wherein when the program causes the processor to obtain entries from the log buffer the program causes the processor to obtain entries indicative of task switches in the target device.

4. The computer-readable medium as defined in claim 2 wherein when the program causes the processor to obtain entries from the log buffer the program causes the processor to obtain entries indicative of a channel of a plurality of possible channels upon which the traced program operated.

5. The computer-readable medium as defined in claim 2 wherein when the program causes the processor to obtain entries from the log buffer the program causes the processor to obtain entries indicative of state of a software state machine implemented by the traced program.

6. A computer-readable medium storing a program that, when executed by a processor, causes the processor to:
write an entry to a log buffer provided within a target device and configured to buffer a plurality of said entries simultaneously, the entry written during execution of a traced program by the target device, and the entry comprising a data field and an index value; and
write a register with the index value contemporaneous with writing the entry, wherein the index value written to the register becomes part of trace data regarding the traced program and correlates the entry to a portion of the trace data.

7. The computer-readable medium as defined in claim 6 wherein when the program causes the processor to write the entry the program causes the processor to write the entry indicative of task switches in the target device.

8. The computer-readable medium as defined in claim 6 wherein when the program causes the processor to write the entry the program causes the processor to write the entry indicative of a channel of a plurality of possible channels upon which the traced program operates.

9. The computer-readable media as defined in claim 6 wherein when the program causes the processor to write a register the program causes the processor to write a register of the processor.

10. The computer-readable medium as defined in claim 6 wherein when the program causes the processor to write the entry to the log buffer the program causes the processor to write the entry indicative of state of a software state machine implemented by the traced program.

11. The computer-readable medium as defined in claim 6 wherein when the program causes the processor to write a register the program causes the processor to write a register accessible to the processor by way of a memory reference.

12. The computer-readable medium as defined in claim 6 wherein when the program causes the processor to write the entry the program causes the processor to write the data field, the index value inherent in the location of the written data field.

13. The computer-readable medium as defined in claim 6 wherein when the program causes the processor to write the entry the program causes the processor to write the data field and the index value.

14. A method comprising:
   executing a traced program on a target device;
   writing, during execution of the traced program, entries to a log buffer within the target device, each entry comprising a data field and an index value;
   obtaining, during execution of the traced program, trace data related to execution of the traced program, including writing, during execution of the traced program, each said index value to a register, wherein each said index value written to the register becomes part of the trace data and correlates the corresponding entry to a respectively corresponding portion of the trace data; and
   one or more selected from the group:
      simultaneously displaying the entries and one of said portions of the trace data on a display device with the displayed entries segregated from the displayed portion of the trace data, the displayed portion of the trace data selected for display on the display device by selecting one of the displayed entries; or
      simultaneously displaying one of the entries and one of said portions of the trace data on the display device with the displayed entry segregated from the displayed portion of the trace data, the displayed entry selected for display on the display device by selecting a trace data entry from the displayed portion of the trace data.

15. The method as defined in claim 14 wherein writing entries to the log buffer further comprises writing entries indicative of task switches in the target device.

16. The method as defined in claim 14 wherein writing entries to the log buffer further comprises writing entries indicative of a channel of a plurality of possible channels upon which the traced program operates.

17. The method as defined in claim 14 wherein writing entries to the log buffer further comprises writing entries indicative of state of a software state machine implemented by the traced program.

18. The method as defined in claim 14 further comprising:
   sending the trace data off the target device substantially contemporaneous with execution of the traced program;
   sending the data fields of the log buffer after execution of the traced program has halted.

19. The method as defined in claim 14 wherein writing further comprises writing to a register of a processor of the target device.

20. The method as defined in claim 14 wherein writing further comprises writing to a memory addressed register of the target device.

* * * * *